United States Patent [19]

Yokogawa et al.

[11] Patent Number: 4,910,298

[45] Date of Patent: Mar. 20, 1990

[54] MONOAZO COMPOUND HAVING TRIAZINYL BRIDGING GROUP AND TWO VINYLSULFONE TYPE FIBER REACTIVE GROUPS IMPARTING YELLOWISH COLOR

[75] Inventors: Kazufumi Yokogawa; Sadanobu Kikkawa, both of Minoo; Naoki Harada, Suita; Takashi Omura, Ashiya, all of Japan

[73] Assignee: Sumitomo Chemical Company, Limited, Osaka, Japan

[21] Appl. No.: 116,147

[22] Filed: Nov. 3, 1987

[30] Foreign Application Priority Data

Nov. 7, 1986 [JP] Japan .................. 61-266459

[51] Int. Cl.⁴ ............... C09B 62/51; C09B 62/507; D06P 1/38; D06P 1/384
[52] U.S. Cl. .................. 534/642; 534/632; 534/638; 534/582; 534/583; 534/887
[58] Field of Search ............. 534/632, 622, 642

[56] References Cited

U.S. PATENT DOCUMENTS 4,626,589 12/1986 Omura et al. .................. 534/605

FOREIGN PATENT DOCUMENTS

| 0076782 | 4/1983 | European Pat. Off. | 534/641 |
| 0167219 | 1/1986 | European Pat. Off. | 534/605 |
| 0184071 | 6/1986 | European Pat. Off. | 534/632 |
| 2632812 | 1/1978 | Fed. Rep. of Germany | 534/632 |
| 0135245 | 3/1963 | France | 534/605 |
| 1350612 | 12/1963 | France | 534/641 |
| 56-112584 | 9/1981 | Japan | 534/632 |
| 61-111364 | 5/1986 | Japan | 534/632 |
| 2016504 | 9/1971 | United Kingdom | 534/632 |

*Primary Examiner*—Floyd D. Higel
*Attorney, Agent, or Firm*—Stevens, Davis, Miller & Mosher

[57] ABSTRACT

A monoazo compound of the following formula,

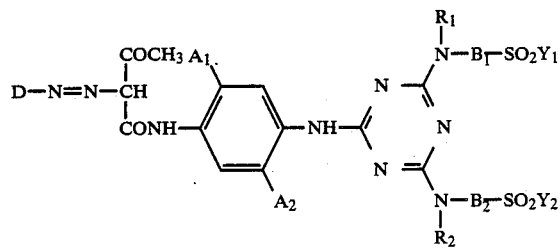

wherein D is sulfonaphthyl, sulfophenyl or carboxyphenyl, any one of $A_1$ and $A_2$ is sulfo and the other is hydrogen, methoxy or ethoxy, $R_1$ and $R_2$ are independently hydrogen or alkyl, $B_1$ and $B_2$ are independently phenylene or naphthylene, and $Y_1$ and $Y_2$ are independently vinyl, $\beta$-sulfatoethyl or the like, which is useful for dyeing or printing fiber materials to give dyed or printed products of a deep color excellent in fastness properties.

10 Claims, No Drawings

MONOAZO COMPOUND HAVING TRIAZINYL BRIDGING GROUP AND TWO VINYLSULFONE TYPE FIBER REACTIVE GROUPS IMPARTING YELLOWISH COLOR

The present invention relates to a water soluble monoazo compound, a process for producing the same and a process for dyeing or printing materials. More specifically, the present invention relates to a monoazo compound having two vinylsulfone type fiber reactive groups, a molecule, which is useful for dyeing or printing hydroxy- or carbonamide-containing materials, particularly those such as cellulose fiber, polyamide fiber, polyurethane fiber, leather or the like, in a yellow color.

Reactive dyes, particularly those having a so-called vinylsulfone type fiber reactive group, have been extensively used for dyeing or printing cellulose fiber and polyamide fiber, because they can be effectively applied to any different kind of dyeing or printing methods and produce dyed or printed products of a brilliant color shade having superior wet fastness properties.

For example, European Patent Publication No. 184,071 discloses a yellow monoazo dye represented by the following formula (A),

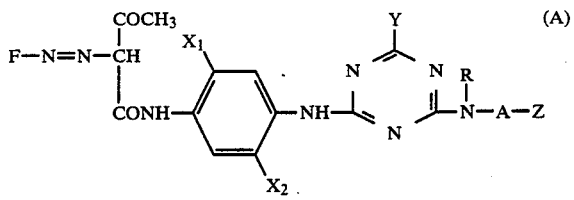

wherein F is sulfonaphthyl or sulfophenyl, any one of $X_1$ and $X_2$ is sulfo, and the other is methoxy or ethoxy, Y is halogeno or sulfoarylamino, R is hydrogen or alkyl, A is phenylene or naphthylene, and Z is $-SO_2CH=CH_2$, $-SO_2CH_2CH_2OSO_3H$ or the like.

In recent years, needs for the build-up property of dyes become severe from viewpoint of dyeing costs and waste water treatment in dye houses. Thus, the dyes of this kind also await improvement in the dye performance including the build-up property.

The present inventors have undertaken extensive studies to find a dye of this kind which is superior in dye performance such as fastness properties, level-dyeability and water solubility as well as build-up property, and as a result have found a specific compound meeting the needs described above.

The present invention provides a monoazo compound of the following formula (I),

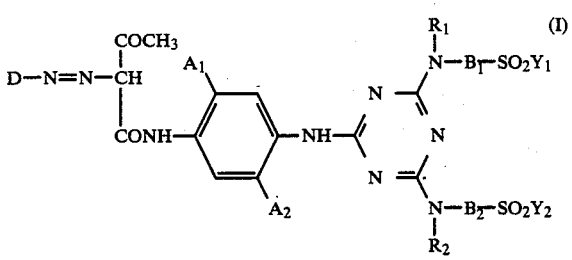

wherein D is naphthyl unsubstituted or substituted twice or three times by sulfo, or sulfo- or carboxy-phenyl substituted by methyl, ethyl, methoxy, ethoxy, phenoxy, acetylamino, propionylamino, 2-carboxyvinylcarbonylamino, 2-carboxyethylcarbonylamino, benzoylamino or benzothiazolyl, any one of $A_1$ and $A_2$ is sulfo, and the other is hydrogen, methoxy or ethoxy, $R_1$ and $R_2$ independently of one another are each hydrogen or unsubstituted or substituted alkyl, $B_1$ and $B_2$ independently of one another are each phenylene unsubstituted or substituted once or twice by methyl, methoxy, ethyl, ethoxy, chloro, bromo, sulfo or carboxy, or naphthylene unsubstituted or substituted by sulfo, and $Y_1$ and $Y_2$ independently of one another are each $-CH=CH_2$ or $-CH_2CH_2Z$ in which Z is a group splittable by the action of an alkali, and a process for the monoazo compound of the formula (I), which comprises reacting a monohalogenotriazinyl compound of the following formula (II),

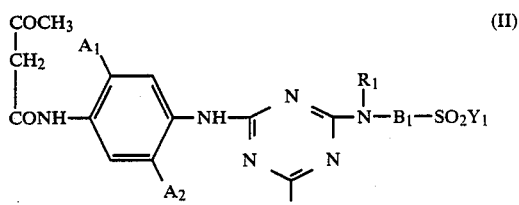

wherein X is halogeno, and $A_1$, $A_2$, $B_1$, $R_1$ and $Y_1$ are as defined above, with a diazonium salt of an aromatic amine compound of the following formula (III),

D—NH$_2$ (III)

wherein D is as defined above, followed by condensation with an amine compound of the following formula (IV),

$\begin{array}{c} R_2 \\ | \\ NH-B_2-SO_2Y_2 \end{array}$ (IV)

wherein $B_2$, $R_2$ and $Y_2$ are as defined above.

The present invention also provides a process for dyeing or printing hydroxy- or carbonamide-containing materials, which comprises using the monoazo compound of the formula (I).

In the above formula (I), the alkyl represented by $R_1$ and $R_2$ is preferably one having 1 to 4 carbon atoms, which is unsubstituted or substituted by hydroxy, cyano, $C_{1-4}$ alkoxy, halogeno, carboxy, carbamoyl, $C_{1-4}$ alkoxycarbonyl, $C_{1-4}$ alkylcarbonyloxy, sulfo, sulfamoyl or the like. Examples thereof are the same as disclosed in Published Unexamined Japanese Patent Application No. 122549/1984. Of these alkyl groups, preferred are methyl and ethyl. In the present invention, any one of $R_1$ and $R_2$ is preferably hydrogen.

The phenylene represented by $B_1$ and $B_2$ may be unsubstituted or substituted by methyl, ethyl, methoxy, ethoxy, halogeno (e.g. chloro, bromo etc.) or sulfo, and the naphthylene may be unsubstituted or substituted by sulfo. Examples thereof are the same as those disclosed in Published Unexamined Japanese Patent Application No. 122549/1984. Of these, preferred are phenylene unsubstituted or substituted by methyl or methoxy.

With respect to $A_1$ and $A_2$, preferred in the present invention is a case where $A_1$ is hydrogen, methoxy or ethoxy, and $A_2$ is sulfo.

The symbol Z in $-CH_2CH_2Z$ which is represented by $Y_1$ and $Y_2$ denotes a group capable of being split by the action of an alkali, and includes various groups known per se, such as sulfato, thiosulfato, acetoxy, chloro and the like. Of these groups represented by $Y_1$ and $Y_2$, preferred is a β-sulfatoethyl group (—$CH_2CH_2OSO_3H$), which may be incorporated with a vinyl group (—$CH=CH_2$). In the present invention, the most preferred is a case where both $Y_1$ and $Y_2$ denote the β-sulfatoethyl.

Examples of the naphthyl represented by D are

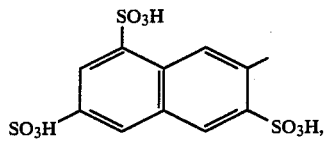

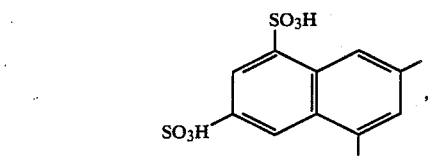

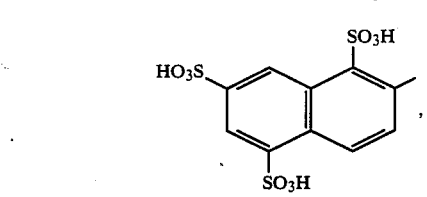

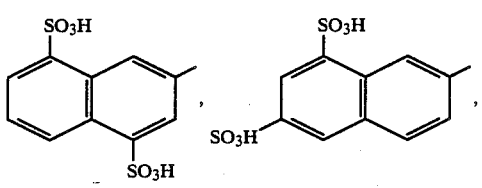

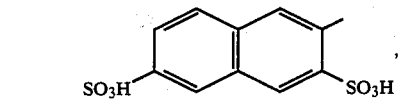

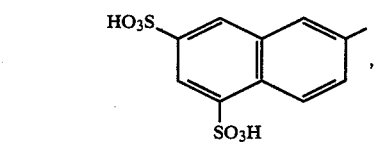

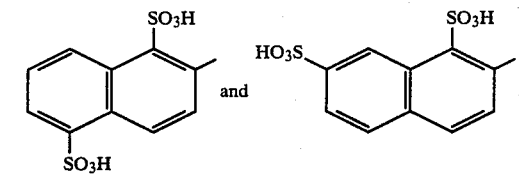

and

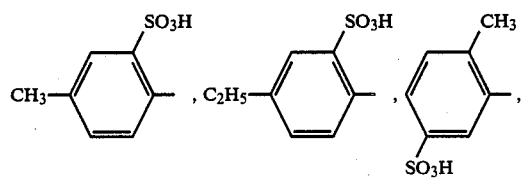

Examples of the sulfo- or carboxy-phenyl represented by D are

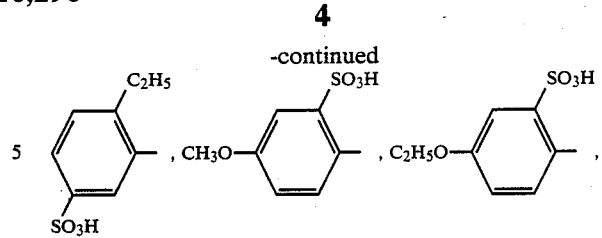

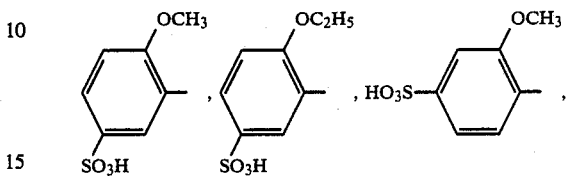

-continued

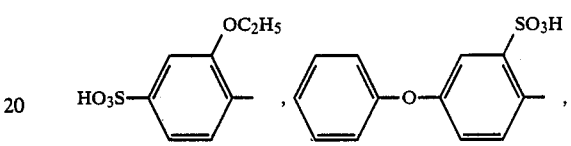

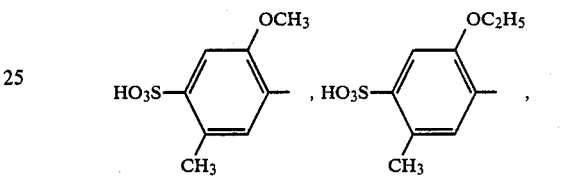

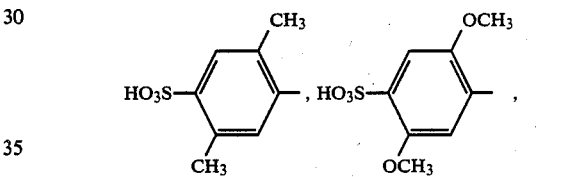

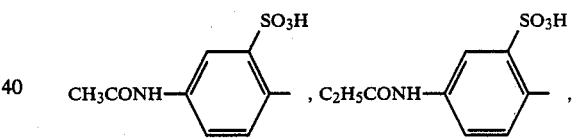

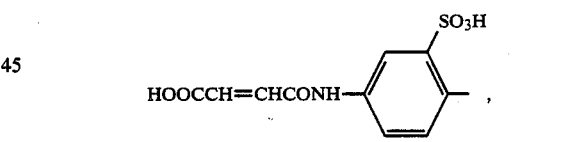

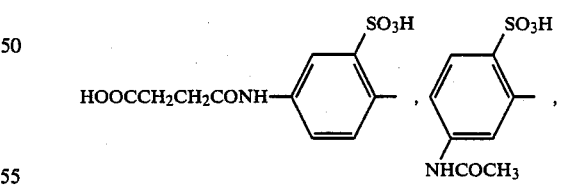

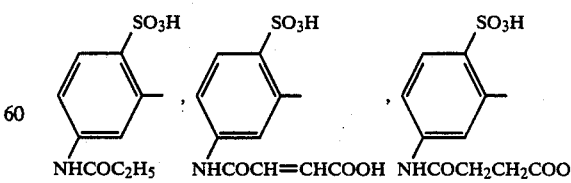

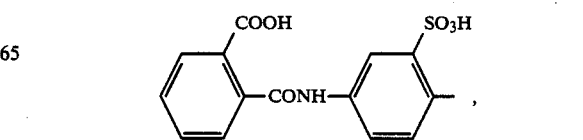

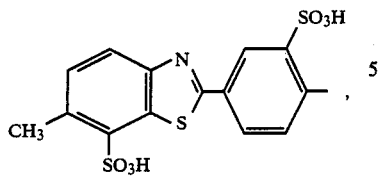

and those having carboxy in place of the sulfo of the above formulas.

Among the above examples for the symbol D, particularly preferred are

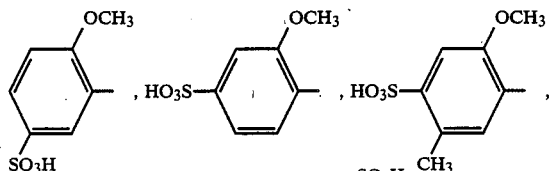

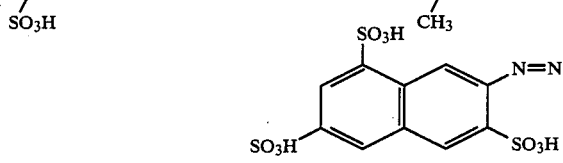

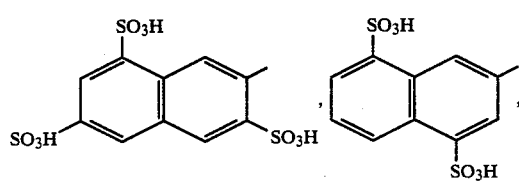

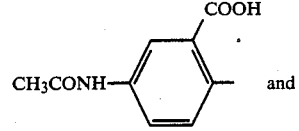

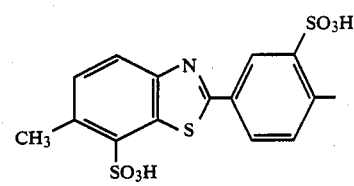

In the present invention, preferable monoazo compounds included in the formula (I) are those represented by the following formulas (I-1), (I-2) and (I-3), in each free acid form,

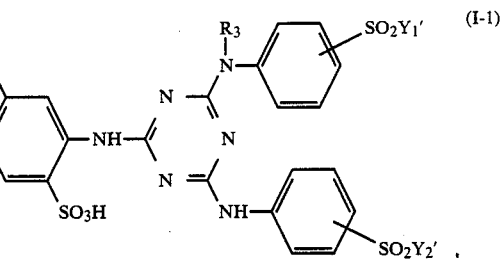

wherein $A_3$ is methoxy or ethoxy, $R_3$ is hydrogen, methyl or ethyl, and $Y_1'$ and $Y_2'$ are independently of one another are each —CH=CH$_2$ or —CH$_2$CH$_2$OSO$_3$H.

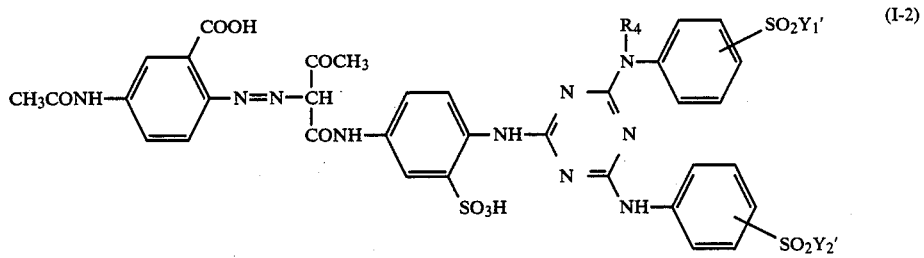

wherein $R_4$ is hydrogen, methyl or ethyl, and $Y_1'$ and $Y_2'$ are as defined above, and

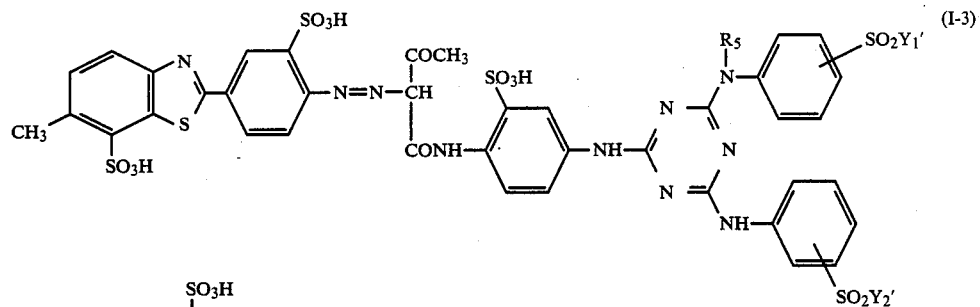

wherein $R_5$ is hydrogen, methyl or ethyl and $Y_1'$ and $Y_2'$ are as defined above. Of these, particularly preferable is the monoazo compound of the formula (I-1).

These monoazo compounds may be preferably in alkali metal or alkaline earth metal salts, particularly those such as sodium and potassium salts.

The monoazo compound of the formula (I) can be produced in a manner known per se. For example, the monoazo compound (I) can be produced by reacting the monohalotriazinyl compound of the formula (II) with a diazonium salt of the aromatic amine of the formula (III), followed by condensation with the amine of the formula (IV).

The diazotization of the aromatic amine (III) can be effected in a usual manner, and the coupling reaction between the monohalotriazinyl compound (II) and the diazonium salt of the aromatic amine (III) can be effected in an aqueous medium at a temperature of 50° to 100° C. within a pH of 3 to 6.

The monohalotriazinyl compound (II) can be produced in various manners. For example, a diaminobenzene compound of the following formula (V),

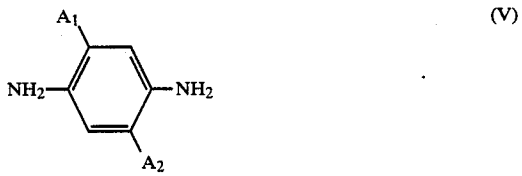

wherein $A_1$ and $A_2$ are as defined above, is allowed to react with diketene in an aqueous medium at a temperature of 0° to 40° C. within a pH of 4 to 8. Successively, any one of the product obtained above and an amine compound of the following formula (VI),

wherein $R_1$, $B_1$ and $Y_1$ are as defined above, is subjected to first condensation with a cyanuric halide such as cyanuric chloride, followed by second condensation with a remaining one. The first condensation can be effected at a temperature of 0° to 30° C., while controlling the pH within 2 to 7, in an aqueous medium, and the second condensation at a temperature of 20° to 60° C., while controlling the pH within 4 to 7.

Depending on the reactivity of the diaminobenzene compound (V), the amine compound (VI) and the diaminobenzene compound (V) may be subjected to condensations with the cyanuric halide in an optional order, and the resulting condensate may be allowed to react with diketene to produce the monohalotriazinyl compound (II).

In the above reactions, the starting compounds may be used in the form of a free acid or an alkali metal or alkaline earth metal salt, depending on the reaction conditions.

After completion of the reaction, the monoazo compound-containing reaction mixture may be formed into a liquid commercial product, if desired, after removing inorganic salts and with addition of a stabilizer or a dyeing improver. The liquid product obtained or the aforesaid reaction mixture may be subjected to evaporation or spray-drying, thereby obtaining a powdery commercial product. Alternatively, according to a conventional manner, the reaction mixture may be formed into either a liquid or powdery commercial product through salting-out using an electrolyte.

The monoazo compound (I) of the present invention is fiber-reactive and useful for dyeing or printing hydroxyl group-containing and amide group-containing materials.

The hydroxyl group-containing materials include natural or synthetic hydroxyl group-containing materials such as cellulose fiber materials, regenerated products thereof and polyvinyl alcohol. Examples of the cellulose fiber materials are cotton and other vegetable fibers such as linen, hemp, jute and ramie fibers. Examples of the regenerated cellulose fibers are viscose staple and filament viscose.

The amide group-containing materials include synthetic or natural polyamide and polyurethane. Examples of the materials, particularly in the fibrous forms, are wool and other animal furs, silk, leather, polyamide-6,6, polyamide-6, polyamide-11 and polyamide-4.

The dyeing may be carried out in a suitable manner, which can be selected from conventional manners depending on the physical and chemical properties of said fiber materials.

For example, cellulose fiber materials can be dyed using the present compound by an exhaustion dyeing, padding including cold batch-up dyeing or printing method.

The exhaustion dyeing can be carried out at a relatively low temperature in the presence of an acid binding agent such as sodium carbonate, trisodium phosphate, sodium hydroxide and the like, if desired, using a neutral salt such as sodium sulfate, sodium chloride and the like.

In carrying out the printing method, a color paste can be prepared using a stock paste or emulsion paste such as sodium alginate, starch ether or the like, and an alkali such as sodium carbonate, sodium hydrogen-carbonate, sodium trichloroacetate, the corresponding potassium salts and alkali-liberating compounds such as alkaline earth metal compounds, if desired, together with a printing auxiliary agent such as urea or a dispersant. Fibers may be printed with the color paste, followed by heat treatment, particularly in the presence of steam, thereby performing the desired printing.

In the cold-pad-batch-up method, a padding liquor can be prepared using as an acid binding agent sodium hydroxide alone or in a mixture thereof with sodium silicate, sodium carbonate, trisodium phosphate or the like, if desired, together with a hydrotropic agent such as urea or a penetrant. Fibers may be padded with the padding liquor obtained, batched up on a roller, allowed to stand for 3 hours or over night and then subjected to after-treatments such as washing with water and drying, thereby performing the desired padding.

The monoazo compound (I) of the present invention can be characterized by excellent dye performances in the dyeing and printing of fiber materials, particularly cellulose fiber materials. The monoazo compound (I) can exhibit high exhaustion and fixing percentages and extremely excellent build-up, level dyeing and washing-off properties, and shows little change in the dyeing performance even when the dyebath conditions such as temperature, bath ratio, concentration of inorganic salts and the like are changed. The monoazo compound (I) can be also characterized by products dyed or printed using it, which products are excellent in fastness properties such as fastness to light, perspiration-light, perspiration, acid-hydrolysis, washing and chlorine.

The present invention is illustrated in more detail with reference to the following Examples, which are Only illustrative, but not limitative. In Examples, all parts and % are by weight.

EXAMPLE 1

4-Methoxy-2,5-diaminobenzenesulfonic acid (6.5 parts) was dissolved in water (200 parts) within a pH of 6 to 7, and diketene (2.5 parts) was dropwise added to the above solution at 10° to 20° C. over 30 minutes. The mixture was stirred for 2 hours at that temperature, and thereafter dropwise added to a dispersion of cyanuric chloride (5.5 parts) in ice water (100 parts) at 0° to 5° C. over 1 hour, while controlling the pH within 3 to 4 using 20% aqueous sodium carbonate solution. The mixture was stirred for additional 2 hours.

Successively, N-ethylaniline-3-β-sulfatoethylsulfone (9.2 parts) was added to the above reaction mixture, and the resulting mixture was heated to 30° C., while controlling the pH within 5 to 6 using 20% aqueous sodium carbonate solution, and stirred for additional 2 hours at that temperature within that pH. Then, the reaction mixture was cooled to 0° to 5° C., and a diazonium liquor of 2-aminonaphthalene-3,6,8-trisulfonic acid (11.5 parts) was added to the above reaction mixture over 1 hour, during which the pH was kept within 5 to 6 using 20% aqueous sodium carbonate solution. The reaction mixture was stirred for 3 hours at that temperature within that pH, and then 1-aminobenzene-3-βsulfatoethylsulfone (25 parts) was added thereto. The resulting mixture was stirred for 8 hours at 50° to 80° C. within a pH of 3 to 5. Thereafter, the reaction mixture was mixed with sodium chloride to precipitate crystals, which were separated on a filter and dried at 60° C. to obtain a monoazo compound of the following formula.

pH within 6 to 7, and diketene (2.5 parts) was dropwise added to the above clarified solution at 10° to 20° C. over 1 hour. The mixture was stirred for 1 hour at that temperature, and thereafter added dropwise to a dispersion of cyanuric chloride (5.5 parts) in ice water (100 parts) at 0° to 5° C. over 1 hour, while controlling the pH within 3 to 4 using 20% aqueous sodium carbonate solution. The mixture was stirred for additional 2 hours.

Successively, N-ethylaniline-3-β-sulfatoethylsulfone (9.2 parts) was added to the above reaction mixture, and the resulting mixture was heated to 30° C., while controlling the pH within 5 to 6 using 20% aqueous sodium carbonate solution. The mixture was stirred for additional 2 hours at that temperature within that pH. Thereafter, to the reaction mixture cooled to 0° to 5° C. was dropwise added a diaznoium liquor of 5-acetylaminoanthranilic acid (5.8 parts) over 1 hour, during which the pH was kept within 5 to 6 using 20% sodium carbonate solution, and the mixture was stirred for 3 hours at that temperature within that pH. Thereafter, 1-aminobenzene-3-β-sulfatoethylsulfone (25 parts) was added to the above reaction mixture, and the resulting mixture was stirred at 50° to 80° C. for 8 hours within a pH of 3 to 5. Then, the reaction mixture was mixed with sodium chloride to precipitate crystals, which were separated on a filter and dried at 60° C. to obtain a monoazo compound of the following formula.

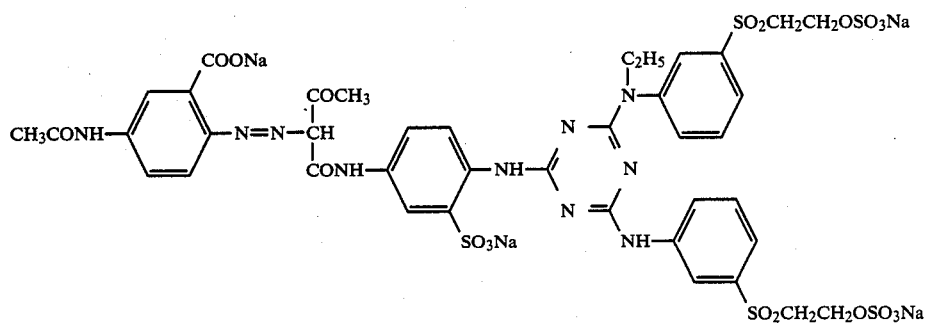

(λ_max: 399 nm)

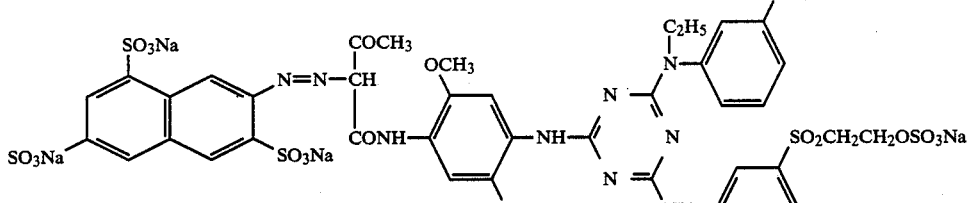

(λ_max: 403 nm <water>)

EXAMPLE 2

A mixture of 2,5-diaminobenzenesulfonic acid (5.6 parts) in water (200 parts) was clarified by the addition of 30% aqueous sodium hydroxide solution to make the

EXAMPLE 3

Using the diaminobenzene compound to be subjected to reaction with diketene, the aromatic amine compound to be diazotized, the amine compound to be subjected to second condensation with cyanuric chloride, and the amine compound to be subjected to third condensation, of the formulas (V), (III), (VI) and (IV), respectively, which are as shown in the columns A, B, C and D of the following table, respectively, in a manner similar to that of Example 1 or 2, there was obtained the corresponding monoazo compound characterized by a color on cellulose fibers as shown in the column E of the following table.

| Run No. | A<br>Diaminobenzene of Formula (V) | B<br>Aromatic amine of Formula (III) | C<br>Amine of Formula (VI) | D<br>Amine of Formula (IV) | E<br>Shade on Cellulose |
|---|---|---|---|---|---|
| 1 | 4-Methoxy-2,5-diaminobenzenesulfonic acid | 2-Aminonaphthalene-3,6,8-trisulfonic acid | N-Ethylaniline-3-$\beta$-sulfatoethylsulfone | 1-Aminobenzene-4-$\beta$-sulfatoethylsulfone | Greenish yellow |
| 2 | 4-Methoxy-2,5-diaminobenzenesulfonic acid | 2-Aminonaphthalene-3,6,8-trisulfonic acid | N-methylaniline-3-$\beta$-sulfatoethylsulfone | 1-Aminobenzene-4-$\beta$-sulfatoethylsulfone | Greenish yellow |
| 3 | 4-Methoxy-2,5-diaminobenzenesulfonic acid | 2-Aminonaphthalene-3,6,8-trisulfonic acid | N-Methylaniline-3-$\beta$-sulfatoethylsulfone | 1-Aminobenzene-3-$\beta$-sulfatoethylsulfone | Greenish yellow |
| 4 | 4-Methoxy-2,5-diaminobenzenesulfonic acid | 2-Aminonaphthalene-3,6,8-trisulfonic acid | 1-Aminobenzene-4-$\beta$-sulfatoethylsulfone | 1-Aminobenzene-3-$\beta$-sulfatoethylsulfone | Greenish yellow |
| 5 | 4-Methoxy-2,5-diaminobenzenesulfonic acid | 2-Aminonaphthalene-3,6,8-trisulfonic acid | 1-Aminobenzene-3-$\beta$-sulfatoethylsulfone | 1-Aminobenzene-3-$\beta$-sulfatoethylsulfone | Greenish yellow |
| 6 | 4-Methoxy-2,5-diaminobenzenesulfonic acid | 2-Aminonaphthalene-3,6,8-trisulfonic acid | N-Ethylaniline-4-$\beta$-sulfatoethylsulfone | 1-Aminobenzene-3-$\beta$-sulfatoethylsulfone | Greenish yellow |
| 7 | 4-Methoxy-2,5-diaminobenzenesulfonic acid | 2-Aminonaphthalene-3,6,8-trisulfonic acid | N-Ethylaniline-4-$\beta$-sulfatoethylsulfone | 1-Aminobenzene-4-$\beta$-sulfatoethylsulfone | Greenish yellow |
| 8 | 4-Methoxy-2,5-diaminobenzenesulfonic acid | 2-Aminonaphthalene-3,6,8-trisulfonic acid | 1-Aminobenzene-4-$\beta$-sulfatoethylsulfone | 1-Aminobenzene-4-$\beta$-sulfatoethylsulfone | Greenish yellow |
| 9 | 4-Methoxy-2,5-diaminobenzenesulfonic acid | 2-Aminonaphthalene-3,6,8-trisulfonic acid | N-Methylaniline-4-$\beta$-sulfatoethylsulfone | 1-Aminobenzene-3-$\beta$-sulfatoethylsulfone | Greenish yellow |
| 10 | 4-Methoxy-2,5-diaminobenzenesulfonic acid | 2-Aminonaphthalene-3,6,8-trisulfonic acid | 2-Aminonaphthalene-6-$\beta$-sulfatoethylsulfone-1-sulfonic acid | 1-Aminobenzene-3-$\beta$-sulfatoethylsulfone | Yellow |
| 11 | 4-Methoxy-2,5-diaminobenzenesulfonic acid | 2-Aminonaphthalene-3,6,8-trisulfonic acid | 2-Aminonaphthalene-6-$\beta$-sulfatoethylsulfone-1-sulfonic acid | 1-Amino-4-methoxybenzene-3-$\beta$-sulfatoethylsulfone | Yellow |
| 12 | 4-Methoxy-2,5-diaminobenzenesulfonic acid | 2-Aminonaphthalene-3,6,8-trisulfonic acid | 2-Aminonaphthalene-8-$\beta$-sulfatoethylsulfone-6-sulfonic acid | 1-Aminobenzene-3-$\beta$-sulfatoethylsulfone | Yellow |
| 13 | 4-Ethoxy-2,5-diaminobenzenesulfonic acid | 2-Aminonaphthalene-3,6,8-trisulfonic acid | N-Ethylaniline-3-$\beta$-sulfatoethylsulfone | 1-Aminobenzene-3-$\beta$-sulfatoethylsulfone | Greenish yellow |
| 14 | 4-Ethoxy-2,5-diaminobenzenesulfonic acid | 2-Aminonaphthalene-3,6,8-trisulfonic acid | N-Ethylaniline-3-$\beta$-sulfatoethylsulfone | 1-Aminobenzene-4-$\beta$-sulfatoethylsulfone | Greenish yellow |
| 15 | 4-Ethoxy-2,5-diaminobenzenesulfonic acid | 2-Aminonaphthalene-3,6,8-trisulfonic acid | 2-Aminonaphthalene-6-$\beta$-sulfatoethylsulfone-1-sulfonic acid | 1-Aminobenzene-4-$\beta$-sulfatoethylsulfone | Yellow |
| 16 | 4-Ethoxy-2,5-diaminobenzenesulfonic acid | 2-Aminonaphthalene-3,6,8-trisulfonic acid | 2-Aminonaphthalene-6-$\beta$-sulfatoethylsulfone-1-sulfonic acid | 1-Aminobenzene-3-$\beta$-sulfatoethylsulfone | Yellow |
| 17 | 4-Methoxy-2,5-diaminobenzenesulfonic acid | 5-Acetylaminoanthranilic acid | N-Ethylaniline 3-$\beta$-sulfatoethylsulfone | 1-Aminobenzene-3-62 -sulfatoethylsulfone | Greenish yellow |
| 18 | 4-Methoxy-2,5- | 5-Acetylamino- | N-Ethylaniline- | 1-Aminoben- | Greenish |

-continued

| Run No. | A<br>Diaminobenzene<br>of Formula (V) | B<br>Aromatic amine<br>of Formula (III) | C<br>Amine of<br>Formula (VI) | D<br>Amine of<br>Formula (IV) | E<br>Shade on<br>Cellulose |
|---|---|---|---|---|---|
|  | diaminobenzene-<br>sulfonic acid | anthranilic<br>acid | 4-β-sulfato-<br>ethylsulfone | zene-3-β-<br>sulfatoethyl-<br>sulfone | yellow |
| 19 | 4-Methoxy-2,5-<br>diaminobenzene-<br>sulfonic acid | 5-Acetylamino-<br>anthranilic<br>acid | N-Ethylaniline-<br>3-β-sulfato-<br>ethylsulfone | 1-Aminoben-<br>zene-4-β-<br>sulfatoethyl-<br>sulfone | Greenish<br>yellow |
| 20 | 4-Ethoxy-2,5-<br>diaminobenzene-<br>sulfonic acid | 5-Acetylamino-<br>anthranilic<br>acid | N-Ethylaniline-<br>3-β-sulfato-<br>ethylsulfone | 1-Aminoben-<br>zene-3-β-<br>sulfatoethyl-<br>sulfone | Greenish<br>yellow |
| 21 | 2,5-Diamino-<br>benzene-<br>sulfonic<br>acid | 5-Acetylamino-<br>anthranilic<br>acid | N-Ethylaniline-<br>3-β-sulfato-<br>ethylsulfone | 1-Aminoben-<br>zene-4-β-<br>sulfatoethyl-<br>sulfone | Greenish<br>yellow |
| 22 | 2,5-Diamino-<br>benzene-<br>sulfonic<br>acid | 5-Acetylamino-<br>anthranilic<br>acid | N-Ethylaniline-<br>4-β-sulfato-<br>ethylsulfone | 1-Aminoben-<br>zene-4-β-<br>sulfatoethyl-<br>sulfone | Greenish<br>yellow |
| 23 | 2,5-Diamino-<br>benzene-<br>sulfonic<br>acid | 5-Acetylamino-<br>anthranilic<br>acid | N-Ethylaniline-<br>4-β-sulfato-<br>ethylsulfone | 1-Aminoben-<br>zene-3-β-<br>sulfatoethyl-<br>sulfone | Greenish<br>yellow |
| 24 | 2,5-Diamino-<br>benzene-<br>sulfonic<br>acid | 5-Acetylamino-<br>anthranilic<br>acid | 2-Aminonaph-<br>thalene-6-β-<br>sulfatoethyl-<br>sulfone-1-<br>sulfonic acid | 1-Aminoben-<br>zene-3-β-<br>sulfatoethyl-<br>sulfone | Yellow |
| 25 | 4-Methoxy-2,5-<br>diaminobenzene-<br>sulfonic acid | 2-Aminonaph-<br>thalene-4,8-<br>disulfonic<br>acid | N-Ethylaniline-<br>3-β-sulfato-<br>ethylsulfone | 1-Aminoben-<br>zene-3-β-<br>sulfatoethyl-<br>sulfone | Greenish<br>yellow |
| 26 | 4-Methoxy-2,5-<br>diaminobenzene-<br>sulfonic acid | 2-Aminonaph-<br>thalene-4,8-<br>disulfonic<br>acid | N-Ethylaniline-<br>4-β-sulfato-<br>ethylsulfone | 1-Aminoben-<br>zene-3-β-<br>sulfatoethyl-<br>sulfone | Greenish<br>yellow |
| 27 | 4-Methoxy-2,5-<br>diaminobenzene-<br>sulfonic acid | 1-Amino-2-<br>methoxybenzene-<br>4-sulfonic acid | N-Ethylaniline-<br>3-β-sulfato-<br>ethylsulfone | 1-Aminoben-<br>zene-3-β-<br>sulfatoethyl-<br>sulfone | Greenish<br>yellow |
| 28 | 4-Methoxy-2,5-<br>diaminobenzene-<br>sulfonic acid | 1-Amino-2-<br>methoxy-5-<br>methylbenzene-<br>4-sulfonic acid | N-Ethylaniline-<br>3-β-sulfato-<br>ethylsulfone | 1-Aminoben-<br>zene-3-β-<br>sulfatoethyl-<br>sulfone | Greenish<br>yellow |
| 29 | 2,5-Diamino-<br>benzenesulfonic<br>acid | 2-Aminonaph-<br>thalene-3,6,8-<br>trisulfonic<br>acid | N-Ethylaniline-<br>3-β-sulfato-<br>ethylsulfone | 1-Aminoben-<br>zene-3-β-<br>sulfatoethyl-<br>sulfone | Greenish<br>yellow |
| 30 | 2,5-Diamino-<br>benzenesulfonic<br>acid | 1-Amino-2-<br>methoxybenzene-<br>5-sulfonic<br>acid | N-Ethylaniline-<br>3-β-sulfato-<br>ethylsulfone | 1-Aminoben-<br>zene-3-β-<br>sulfatoethyl-<br>sulfone | Greenish<br>yellow |
| 31 | 4-Methoxy-2,5-<br>diaminobenzene-<br>sulfonic acid | 2-Aminonaph-<br>thalene-3,6,8-<br>trisulfonic<br>acid | N-Ethylaniline-<br>3-β-sulfato-<br>ethylsulfone | 1-Aminoben-<br>zene-3-<br>vinylsulfone | Greenish<br>yellow |
| 32 | 4-Methoxy-2,5-<br>diaminobenzene-<br>sulfonic acid | 2-Aminonaph-<br>thalene-3,6,8-<br>trisulfonic<br>acid | 1-Amino-2-<br>methoxybenzene-<br>5-β-sulfato-<br>ethylsulfone | 2-Aminonaph-<br>thalene-8-β-<br>sulfatoethyl-<br>sulfone-6-<br>sulfonic acid | Yellow |

EXAMPLE 4

A mixture of N-ethylaniline-3-β-sulfatoethylsulfone (9.2 parts) in water (200 parts) was clarified by adjusting the pH within 4 to 5 using 20% aqueous sodium carbonate solution, and then cyanuric chloride (5.5 parts) was added thereto. The mixture was stirred at 10° to 15° C., while controlling the pH within 4 to 5 using 20% aqueous sodium carbonate solution. Successively, 2,5-diaminobenzenesulfonic acid (5.6 parts) was added thereto, and the resulting mixture was heated to 20° to 25° C., while controlling the pH within 4 to 5 using 20% aqueous sodium carbonate solution, and stirred for 5 hours. Thereafter, diketene (5 parts) was dropwise added thereto over 1 hour, and the mixture was stirred at 20° to 25° C. for 5 hours and then cooled to 0° to 5° C. To this reaction mixture was dropwise added a slurry of diazonium salt of dehydrothio-4-toluidinedisulfonic acid (12 parts) over 1 hour, during which the pH was kept within 5 to 6 using 20% aqueous sodium carbonate solution, and the mixture was stirred for 3 hours at that temperature within that pH. Thereafter, 1-aminobenzene-3-β-sulfatoethylsulfon (25 parts) was added thereto, and the mixture was stirred for 8 hours at 50° to 80° C. within a pH of 3 to 5. The resulting reaction mixture was mixed with sodium chloride to precipitate crystals, which were separated on a filter, and dried at 60° C. to obtain a monoazo compound of the following formula.

the shade on cellulose as shown in the following table.

| Run No. | Diaminobenzene compound of Formula (V) | Amine compound of Formula (VI) | Second amine compound of Formula (IV) | Shade on cellulose |
|---|---|---|---|---|
| 1 | SO₃H, NH₂—⌬—NH₂ | C₂H₅—N(H)—⌬—SO₂CH₂CH₂OSO₃H | NH₂—⌬—SO₂CH₂CH₂OSO₃H | Greenish yellow |
| 2 | " | " | NH₂—⌬—SO₂CH₂CH₂OSO₃H | " |
| 3 | " | C₂H₅—N(H)—⌬—SO₂CH₂CH₂OSO₃H (meta) | NH₂—⌬—SO₂CH₂CH₂OSO₃H | " |
| 4 | SO₃H, NH₂—⌬(OCH₃)—NH₂ | C₂H₅—N(H)—⌬—SO₂CH₂CH₂OSO₃H (meta) | NH₂—⌬—SO₂CH₂CH₂OSO₃H | Greenish yellow |
| 5 | " | " | NH₂—⌬—SO₂CH₂CH₂OSO₃H | " |
| 6 | SO₃H, NH₂—⌬—NH₂ | NH₂-naphthalene-SO₃H, SO₂CH₂CH₂OSO₃H | " | " |
| 7 | " | NH₂-naphthalene-SO₂CH₂CH₂OSO₃H, SO₃H | " | " |

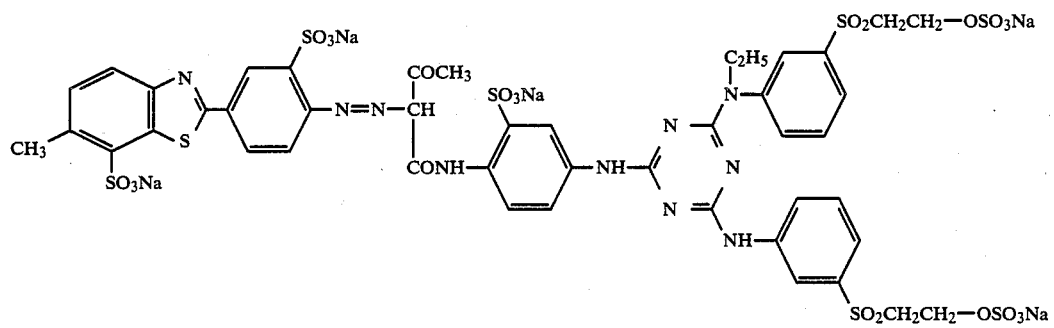

($\lambda_{max}$: 405 nm)

EXAMPLE 5

Example 4 was repeated, with 2,5-diaminobenzenesulfonic acid, N-ethylaniline-3-β-sulfatoethylsulfone and 1-aminobenzene-3-β-sulfatoethylsulfone replaced by the diaminobenzene compound of the formula (V), the amine compound of the formula (VI) and the second amine compound of the formula (IV) as shown in the following table, respectively, thereby obtaining the corresponding monoazo compound characterized by

EXAMPLE 6

The monoazo compounds obtained in Examples 1 to 5 each (0.3 part) was dissolved in water (200 parts), and sodium sulfate (10 parts) and cotton (10 parts) were added thereto. The bath was heated up to 50° C. and for 20 minutes thereafter, sodium carbonate (4 parts) was added thereto.

Dyeing was carried out at that temperature for 1 hour. The cotton taken out was washed with water and soaped to obtain each dyed product of the shade described before excellent in fastness properties.

EXAMPLE 7

The monoazo compounds obtained in Examples 1 to 5 each (15 parts) was dissolved in hot water (200 parts) together with urea (50 parts). To this solution were added a paste (400 parts) prepared by mixing sodium alginate (40 parts) and water (960 parts), and sodium hydrogencarbonate (20 parts) under stirring. The resulting mixture was mixed with water and the paste to obtain a printing paste (1000 parts).

Cotton fabric was printed with the printing paste, predried, steamed at 100° to 103° C. for 5 minutes, washed with cold water and then hot water, boil-soaped, again washed and then dried to obtain each printed product of a deep color excellent in fastness properties.

What is claimed is:

1. A compound of the following formula:

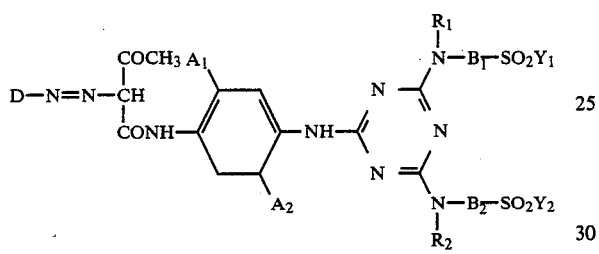

wherein D is naphthyl unsubstituted or substituted twice or three times by sulfo, or sulfo- or carboxy-phenyl substituted by methyl, ethyl, methoxy, ethoxy, phenoxy, acetylamino, propionylamino, 2-carboxyvinylcarbonylamino, 2-carboxyethylcarbonylamino, benzoylamino or benzothiazolyl, any one of $A_1$ and $A_2$ is sulfo, and the other is hydrogen, methoxy or ethoxy, $R_1$ and $R_2$ independently of one another are each hydrogen or alkyl unsubstituted or substituted by hydroxy, cyano, $C_1$-$C_4$alkoxy, halogen, carboxy, carbamoyl, $C_1$-$C_4$ alkoxycarbonyl, $C_1$-$C_4$ alkylcarbonyloxy, sulfo or sulfamoyl, $B_1$ and $B_2$ independently of one another are each phenylene unsubstituted or substituted once or twice by methyl, methoxy, ethyl, ethoxy, chloro, bromo, sulfo or carboxy, or naphthylene unsubstituted or unsubstituted by sulfo, and $Y_1$ and $Y_2$ independently of one another are each —CH=CH$_2$ or —CH$_2$CH$_2$Z in which Z is a group capable of being split by the action of an alkali.

2. A compound according to claim 1, wherein the naphthyl represented by D is a member selected from

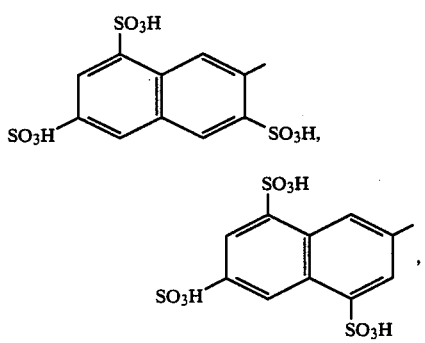

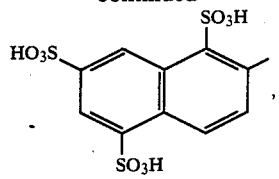

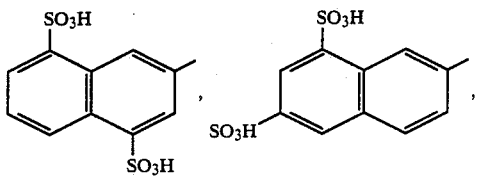

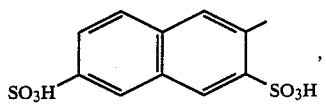

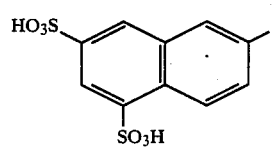

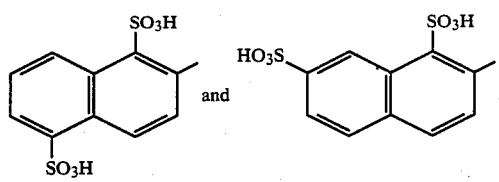

3. A compound according to claim 1, wherein the sulfophenyl or carboxyphenyl represented by D is a member selected from

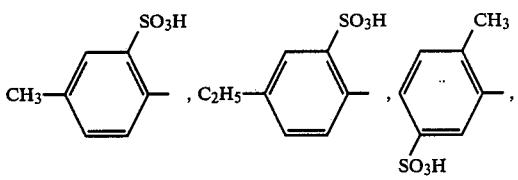

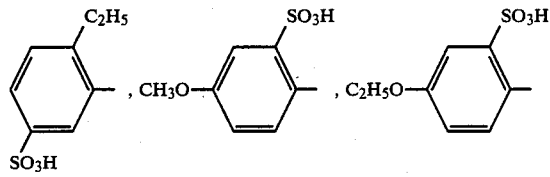

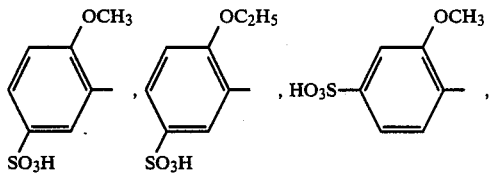

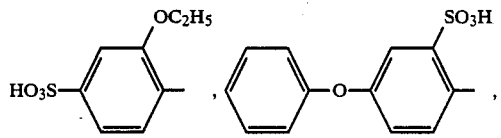

-continued

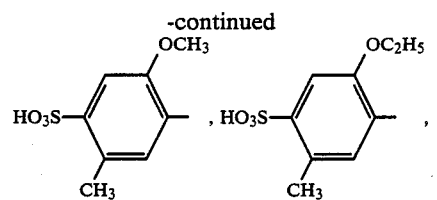

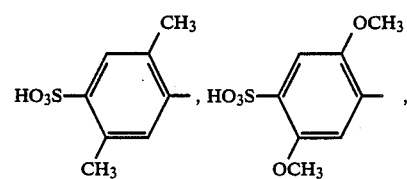

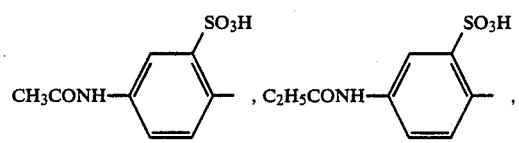

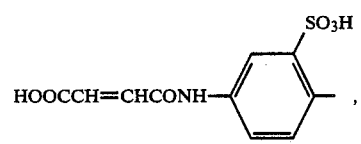

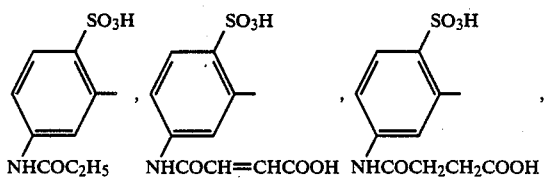

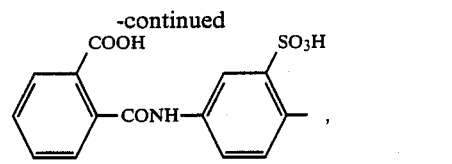

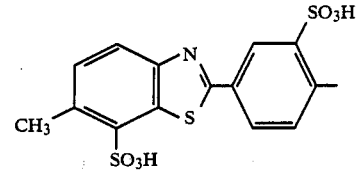

and those having carboxy in place of sulfo in the above formulas.

4. A compound according to claim 1, wherein $A_1$ is hydrogen, methoxy or ethoxy, and $A_2$ is sulfo.

5. A compound according to claim 1, wherein any one of $R_1$ and $R_2$ is hydrogen, and the other is methyl or ethyl.

6. A compound according to claim 1, wherein $B_1$ and $B_2$ independently of one another are each phenylene unsubstituted or substituted by methyl or methoxy.

7. A compound of the following formula in a free acid form,

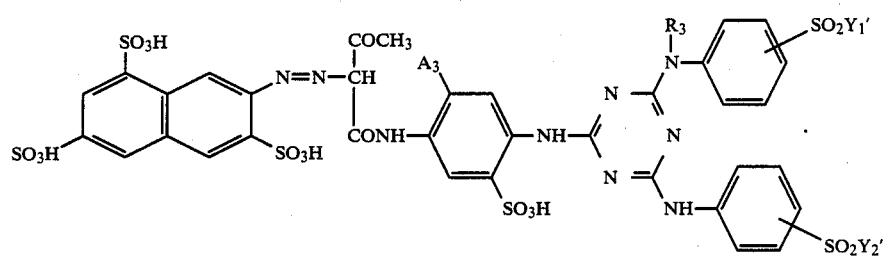

wherein $A_3$ is methoxy or ethoxy, $R_3$ is hydrogen, methyl or ethyl, and $Y_1'$ and $Y_2'$ independently of one another are each —CH=CH$_2$ or —CH$_2$CH$_2$OSO$_3$H.

8. A compound of the following formula in a free acid form,

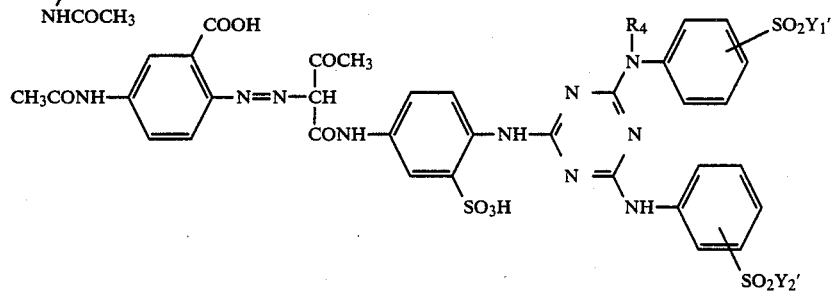

wherein $R_4$ is hydrogen, methyl or ethyl, and $Y_1'$ and $Y_2'$ independently of one another are each —CH=CH$_2$ or —CH$_2$CH$_2$OSO$_3$H.

9. A compound of the following formula in a free acid form,

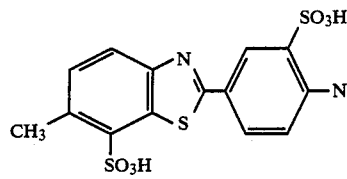
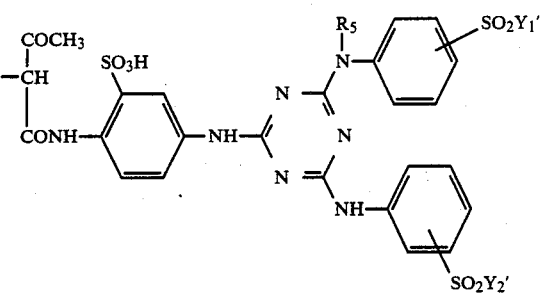
wherein $R_5$ is hydrogen, methyl or ethyl, and $Y_1'$ and $Y_2'$ independently of one another are each —CH=CH$_2$ or —CH$_2$CH$_2$OSO$_3$H.
10. A compound according to claim 1, wherein $Y_1$ and $Y_2$ independently of one another are each —CH=CH$_2$ or CH$_2$CH$_2$Z in which Z is selected from the group consisting of sulfato, thiolsulfato, acetoxy and chloro.
* * * * *